United States Patent [19]

Yim

[11] Patent Number: 4,671,476
[45] Date of Patent: Jun. 9, 1987

[54] ADJUSTABLE SOLDERING IRON STAND

[76] Inventor: Euisub Yim, 557½ Glenwood Rd., Glendale, Calif. 91202

[21] Appl. No.: 817,658

[22] Filed: Jan. 10, 1986

[51] Int. Cl.⁴ .......................................... F16M 13/00
[52] U.S. Cl. ................. 248/117.2; 248/514; 248/176; 219/242
[58] Field of Search ................. 248/514–515, 248/519–520, 117.1–117.7, 128, 133, 136, 139–140, 176, 291, 284, 105–107, 174, 311.3, 312, 184; 211/70.6; 219/242; 403/92

[56] References Cited

U.S. PATENT DOCUMENTS

| | | | |
|---|---|---|---|
| 1,789,475 | 1/1931 | Powell | 219/242 |
| 2,056,951 | 10/1936 | Bohall | 219/242 |
| 2,086,102 | 7/1937 | Stradling | |
| 2,172,682 | 9/1939 | Rauba | 248/117.4 |
| 2,301,885 | 11/1942 | Laehr | 248/515 |
| 2,364,295 | 12/1944 | Hyde | |
| 2,527,435 | 10/1950 | Little et al. | |
| 2,563,781 | 8/1951 | Fry | 403/92 |
| 2,614,779 | 10/1952 | Peterson et al. | |
| 2,621,689 | 12/1952 | Fordon | 403/92 |
| 2,665,961 | 1/1954 | Anderson | 403/92 |
| 2,727,707 | 12/1955 | Wells | 248/514 |
| 3,060,472 | 10/1962 | Horton | 219/242 |
| 3,267,254 | 8/1966 | Weller | 219/242 |
| 3,294,348 | 12/1966 | Cerisano | 248/117.4 |
| 3,706,871 | 12/1972 | Witherow | 248/117.2 |
| 4,065,084 | 12/1977 | Wiener | |
| 4,251,043 | 2/1981 | Horner | 248/117.6 |
| 4,456,816 | 6/1984 | Fortune | 248/117.2 |

Primary Examiner—J. Franklin Foss
Assistant Examiner—Robert A. Olson
Attorney, Agent, or Firm—Henderson & Sturm

[57] ABSTRACT

The present invention relates to a soldering iron stand (10) comprising a base unit (11) a body unit (12) and a sleeve unit (13); wherein said body unit (12) and sleeve unit (13) are mounted for relative motion with respect to one another and said base unit (11), and the base unit (11) is further provided with a body receiving portion (15) whereby the body unit (12) may be disposed at a variety of angles with respect to said base unit (11).

5 Claims, 8 Drawing Figures

ADJUSTABLE SOLDERING IRON STAND

TECHNICAL FIELD

The present invention relates generally to the field of support stands for heated articles, and more specifically to an adjustable support stand for soldering irons.

BACKGROUND OF THE INVENTION

This invention relates to soldering iron support stands, generally and more particularly to an adjustable support stand with means for allowing insertion of the electric soldering iron at a variety of angles.

Portable soldering iron stands generally serve the purpose of making it possible to set down a hot electric soldering iron without exposing people or pieces of equipment to dangerous heat. Stands of this type permit the soldering iron to be inserted in a holder of some type with the handle of the soldering iron resting on the floor or surface of the home. Examples of these types of stands include the U.S. Patents to Stradling U.S. Pat. No. 2,086,102; Hyde U.S. Pat. No. 2,364,295; Petersen U.S. Pat. No. 2,614,779; and Little U.S. Pat. No. 2,527,435.

One drawback with these types of soldering iron stands is that they allow the electric iron to rest on a surface making it difficult for the user to grip the handle and easily remove the iron from the stand. Another drawback is the user must continuously move the stand to the proper angle for reinsertion of the tool during use. Since the art of soldering requires constant movement by the user to reach difficult places rigid stands fail to provide the user with a support that is adjustable to the user without moving the entire stand.

Another drawback involves the problem of the stand heating up as a result of the hotpoint of the iron being in close contact. Prior art stands made of metal or even plastic must be gripped in order to remove the soldering iron. If the stand is hot injury to the user is likely.

As a result of the drawbacks noted in the prior art, an electric soldering iron support has been developed that allows adjustable support for the iron entirely above the surface area on which the support rests and means for keeping the stand cool during use.

SUMMARY OF THE INVENTION

The invention comprises a soldering iron support stand having a sleeve unit pivotally adjustable relative to a base unit in order to allow insertion of a soldering iron in the sleeve unit at various positions. The stand is also provided with an intermediate body unit having heat exchange portions which dissipate heat from the stand during storage of the soldering iron in its heated condition.

An object of the present invention to provide a simple, economical and portable stand for supporting soldering irons.

Another object of the invention is to provide an adjustable sleeve for a soldering iron holder which can be pivoted to a variety of angles relative to the base.

Yet another object of the invention is to provide a soldering iron stand with heat exchange means.

A still further object of this invention is the provision of a soldering iron holder that incorporates the features of flexibility, reliability, and ease of operation not found in the prior art constructions.

The foregoing objects are accomplished by virtue of a unique cooperation between the sleeve unit, the body unit, and the stand unit; whereby the relative position of the sleeve unit and the body unit may be varied not only with respect to one another, but also with respect to the base unit.

BRIEF SUMMARY OF THE DRAWINGS

These and other objects advantages and novel features of the invention will become apparent from the detailed description of the best mode for carrying out the invention which follows; particularly when considered in conjunction with the accompanying drawings, wherein.

BEST MODE FOR CARRYING OUT THE INVENTION

Figure 1:
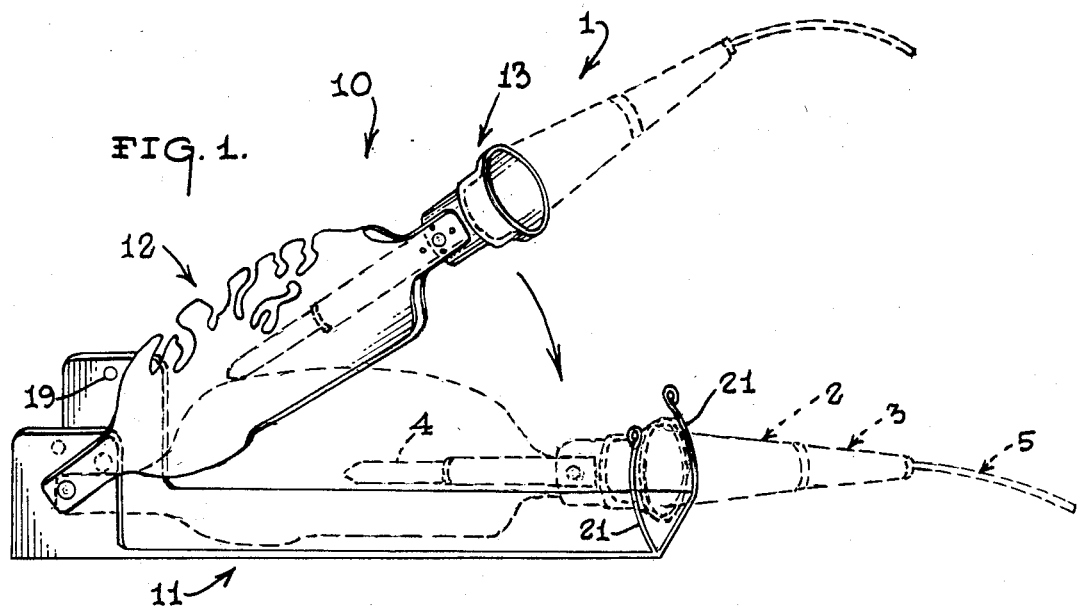
FIG. 1 is a perspective view of the preferred embodiment in use.

As can be seen by reference to FIG. 1, a typical soldering iron construction (1) is depicted in phantom; wherein, the soldering iron (1) comprises a body portion (2), a handle portion (3), a tip portion (4), and an electrical connection (5) for supplying heat to the tip portion (4).

As can also be seen by reference to FIG. 1, the soldering iron support stand of the present invention is designated generally by the reference numeral (10). The support stand (10) comprises in general a base unit (11), a body unit (12); and a sleeve unit (13). These units will now be described in seriatim fashion.

Figure 5:
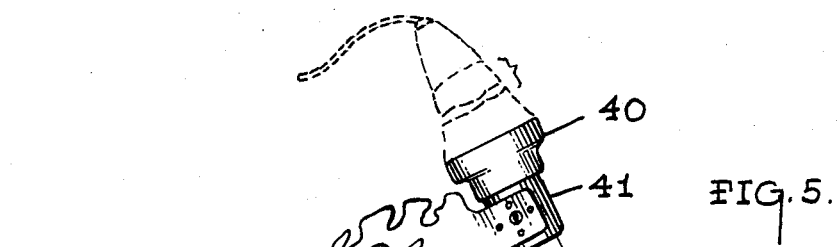
FIG. 5 is a side elevational view of the preferred embodiment in use.
Figure 6:
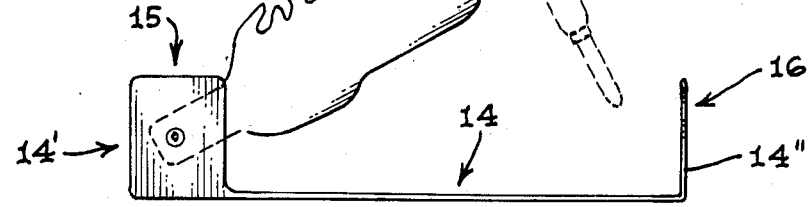
FIG. 6 is a side elevational view of the base unit.

The base unit (11) of the preferred embodiment is depicted in FIGS. 1, 5 and 6, and comprises a generally rectangular base member (14) having a body receiving portion (15) formed on the inboard end (14') and a sleeve receiving portion (16) formed on the outboard end (14").

The body receiving portion (15) of the base member (14) comprises a pair of enlarged vertically disposed ear members (17) formed proximate the inboard end (14') of the base member (14); wherein, each of the ear members (17) is provided with an aperture (18) surrounded by a plurality of spaced detent recesses (19), whose purpose and function will be described shortly.

The sleeve receiving portion (16) of the base member (15) comprises releasable securing means (20), formed on the end (14") of the base member (15); which comprise a pair of leaf spring members (21) spaced from one another and configured to releasably engage the sleeve unit (13), in a well recognized fashion.

Figure 2:
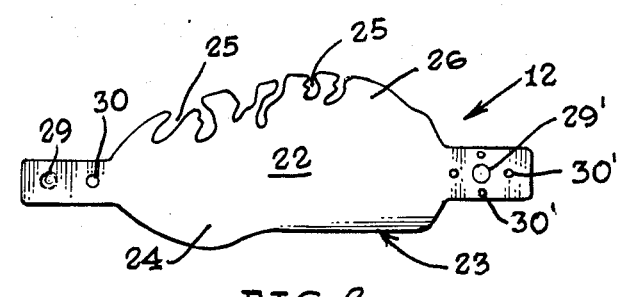
FIG. 2 is a side elevation view of the heat exchanging body member.
Figure 3:
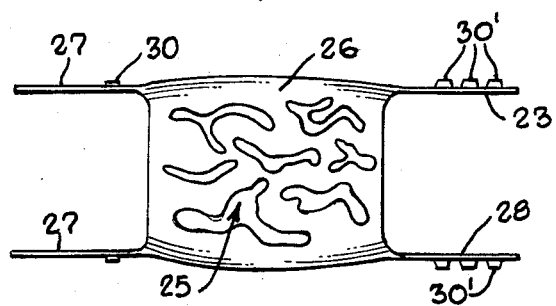
FIG. 3 is a top plan view of the heat exchanging body member.

As can best be seen by reference to FIGS. 2 and 3, the body unit (12) of the preferred embodiment comprises an enlarged contoured hollow body member (22) having an enlarged opening (23) formed on its lower surface (24) and a plurality of smaller openings (25) formed on its upper surface (26). In addition each end of the body member (22) is further provided with a pair of outwardly extending arm members (27)(28).

As shown in FIG. 2, the inboard arms (27) of the body member (22) are provided with an aperture (29) disposed proximate their ends, and an inwardly spaced detent recess (30), which is dimensioned to be received within the detent recesses (19) formed on the ear members (17) of the base member. In like fashion, the aperture (29) on the inboard arms (27) of the body member (22) is dimensioned similar to the apertures (18) in the ear members (17); whereby, the body unit (12) may be pivotally secured to the base unit (11) via a pivot means (31) in a well recognized manner.

It should further be appreciated at this juncture that, by virtue of the pivoted engagement of the body unit (12) with the base unit (11), coupled with the selective engagement of the detent recesses (19) and (30) on the base unit (11) and body unit (12) respectively; the body unit (12) may be releasably supported at a variety of angular positions with respect to the base unit (11).

In the arrangement depicted in FIG. 1, the body unit (12) may be disposed with respect to the base unit (11) at angles of 0°, 45°, and 90°; however, it is to be understood that this is for the purpose of illustration only; and, this invention is only to be limited to the extent that the body unit (12) may be disposed with respect to the base unit at a plurality of angular dispositions between 0° and 90°.

Again referring to FIG. 2, it can be seen that the outboard arms (28) of the body member (22) are provided with apertures (29') which are surrounded by a plurality of spaced detent recesses (30'), whose purpose and function will be described in conjunction with the sleeve unit (13).

Figure 4:
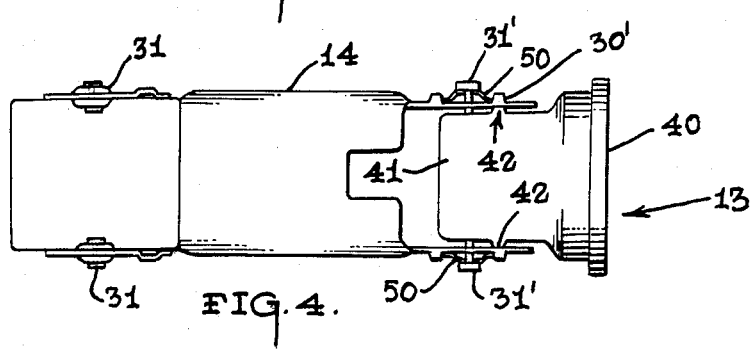
FIG. 4 is an enlarged top plan view of the pivot and detent arrangement on the base unit of the preferred embodiment.

As best depicted in FIGS. 1, 4, and 5 the sleeve unit (13) is pivotally secured to the outboard arms (28) of the body unit (12). The sleeve unit (13) comprises a generally hollow tapered sleeve member (40) dimensioned to receive the tip portion (4) of a typical soldering iron (1), and is further provided with a reduced diameter portion (41), which forms an internal stepped shoulder (not shown) that supports the body portion (2) of a typical soldering iron (1).

As can best be seen by reference to FIG. 4, the reduced diameter portion (41) of the sleeve member (40) is pivotally secured to the outboard arms (28) of the body member (22) via a spring board pivot means (31'), and further provided with at least one detent recess (42) dimensioned to cooperate with the plurality of detent recesses (30') in the outboard arms (28) of the body unit (12). The spring biased pivot means (31') includes a spring washer (50) that allows relative movement between the body unit (12) and the sleeve unit (13), whereby the sleeve detent recess (42) may be withdrawn from engagement with a selected detent recess (30') in the body unit (12) and moved into engagement with another selected detent recess (30') to vary the relative disposition of the body unit (12) with respect to the sleeve unit (13).

Figure 8:
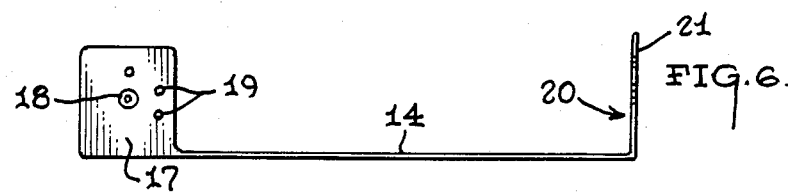
FIG. 8 is a side elevational view of the holder of the alternate embodiment.
Figure 7:
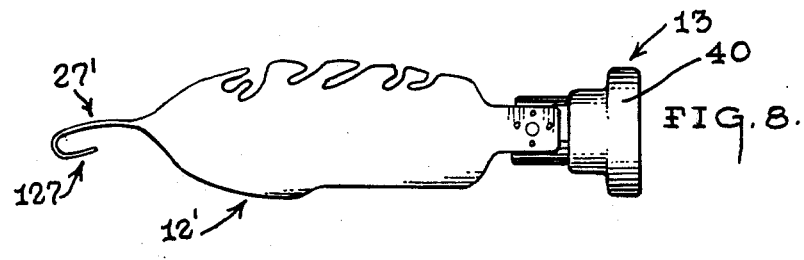
FIG. 7 is a perspective view of an alternate embodiment of this invention.

In the alternate embodiment of the soldering iron support stand (10) depicted in FIGS. 7 and 8, the only structural differences between this version and the preferred embodiment involve the base unit (11') and the inboard end (27') of the body unit (12'). As shown in FIG. 7 the base unit (11') comprises a generally rectangular base member (114) having a relatively thick inboard end (114') which is provided with a body receiving portion (115) comprising a plurality of interconnecting contoured slots (116) which are dimensioned to selectively receive the inboard end (27') of the body unit (12').

The inboard end (27') of the body unit (12') comprises a hook member (127) having a J-shaped configuration. As shown in phantom in FIG. 7, each of the plurality contoured slots (116) in the base member (114) is dimensioned to receive different portions of the hook member (127), whereby the body unit (12') may be releasably supported at a variety of angular dispositions relative to the base unit (11').

As viewed from left to right in FIG. 7 the extreme left hand slot (116') has a generally J-shaped configuration, which is provided to dispose the body unit (12') in a perpendicular orientation with respect to the base member (114). An intermediate slot (116") has a tilted C-shaped configuration, which is provided to dispose the body unit (12') at an angle of approximately 45° with respect to the base member (114); and, the far right hand slot (116''') has a generally L-shaped configuration, which is provided to dispose the body unit (12') generally parallel to the base member (114).

In both the preferred and alternate embodiments of this invention the base units (11) (11') are provided with body receiving portions (15) (115) that allow the body units (12) (12') to be releasably supported at a variety of angles with respect to the base units (11) (11').

In addition, since the construction of the outboard ends of the body units (12) (12') and the sleeve units (13) (13') are identical in both embodiments, the cooperation between these components is the same.

The operation of the soldering iron support stand proceeds as follows: a user would select a preferred orientation of the body unit (12) with respect to the base unit (11) and engage the body unit (12) in the appropriate location on body receiving portion (15) of the base unit. The tip portion (4) and the body portion (2) of the soldering iron (1) would then be inserted into the sleeve unit (13) to releasably seat the soldering iron (1) within the sleeve unit (13). At this point the sleeve unit (13) is rotated with respect to the body unit (12), to bring the at least one detent recess (42) on the sleeve member (40) into engagement with a selected one of the plurality of detent recesses (30') in the outboard arms (28) of the body unit (12).

As can best be seen by reference to FIGS. 1 and 5, the heated tip portion (4) of the soldering iron (1) may be optionally pivoted away from the body unit (12) during use; or pivoted into the body unit (12) for safety or storage purposes.

In the safety or storage mode depicted in FIG. 1, after the heated tip portion (4) has passed inwardly through the enlarged opening (23) formed on the lower surface (24) of the hollow body member (22), the hollow body member (22) forms a protective spaced envelope around the heated tip (4), wherein the tip is prevented from coming into direct heat transfer contact with the interior surface of the hollow body member (22).

It should further be noted that the plurality of smaller contoured openings (25) formed on the upper surface (26) of the hollow body member (22); not only serve a decorative purpose; but, also function to promote the cooling of the heated tip (4) by allowing the heated air generated by the tip to escape through the openings (25).

Having thereby described the subject matter of this invention, it should be obvious that many substitutions, modifications and variations of the invention are possible in light of the above teachings. It is therefore to be understood that the invention, as taught and described herein, is only to be limited to the extent of the breadth and scope of the appended claims.

What is claimed is:

1. A soldering iron support stand in combination with a soldering iron comprising a body portion, a handle portion and a tip portion; wherein, the support stand comprises:
    a base unit comprising a base member having a body receiving portion formed on one end;
    a body unit comprising an elongated hollow body member adapted to receive a portion of the soldering iron and having an inboard end and an outboard end; wherein, the inboard end is adapted to releasably engage and move relative to said body receiving portion of said base unit; and, wherein, the outboard end is provided with arm members and each arm member is provided with a plurality of detent recesses; and, the body member is further provided with an enlarged opening on the bottom and a plurality of smaller openings on the top; and,
    a sleeve unit pivotally disposed on the outboard end of the hollow body member; wherein, the sleeve unit comprises a hollow sleeve member having a reduced diameter portion; wherein, the sleeve member is adapted to receive the tip portion of the soldering iron, and the reduced diameter portion is adapted to limit the travel of the body portion of the soldering iron relative to the sleeve member; wherein, the sleeve member is further provided with at least one detent recess that cooperates with the said plurality of detent recesses on the outboard arm members, whereby the sleeve unit may be disposed at a variety of angles to releasably support the body portion of the soldering iron with respect to said body unit.

2. A soldering iron support stand as in claim 1; wherein the body receiving portion of the base member comprises:
    a pair of vertically disposed ear members provided with a plurality of spaced detent recesses.

3. A soldering iron support stand as in claim 2; wherein the inboard end of the body member is provided with arm members, that are pivotally secured to the ear members on said base member, and provided with at least one detent recess that cooperates with said plurality of spaced detent recesses on said ear members, to dispose the body unit at a variety of angles with respect to said base unit.

4. A soldering iron support stand as in claim 1; wherein the body receiving portion of the base member comprises:
    a plurality of interconnected contoured slots formed in the base member.

5. A soldering iron support stand as in claim 4; wherein the inboard end of said body member comprises a hook portion configured to be releasably engaged by said plurality of interconnected contoured slots in said base member, to dispose the body unit at a variety of angles with respect to said base unit.

* * * * *